(No Model.) 5 Sheets—Sheet 1.
G. C. BLICKENSDERFER & H. SMITH.
CONVEYER APPARATUS.
No. 298,274. Patented May 6, 1884.
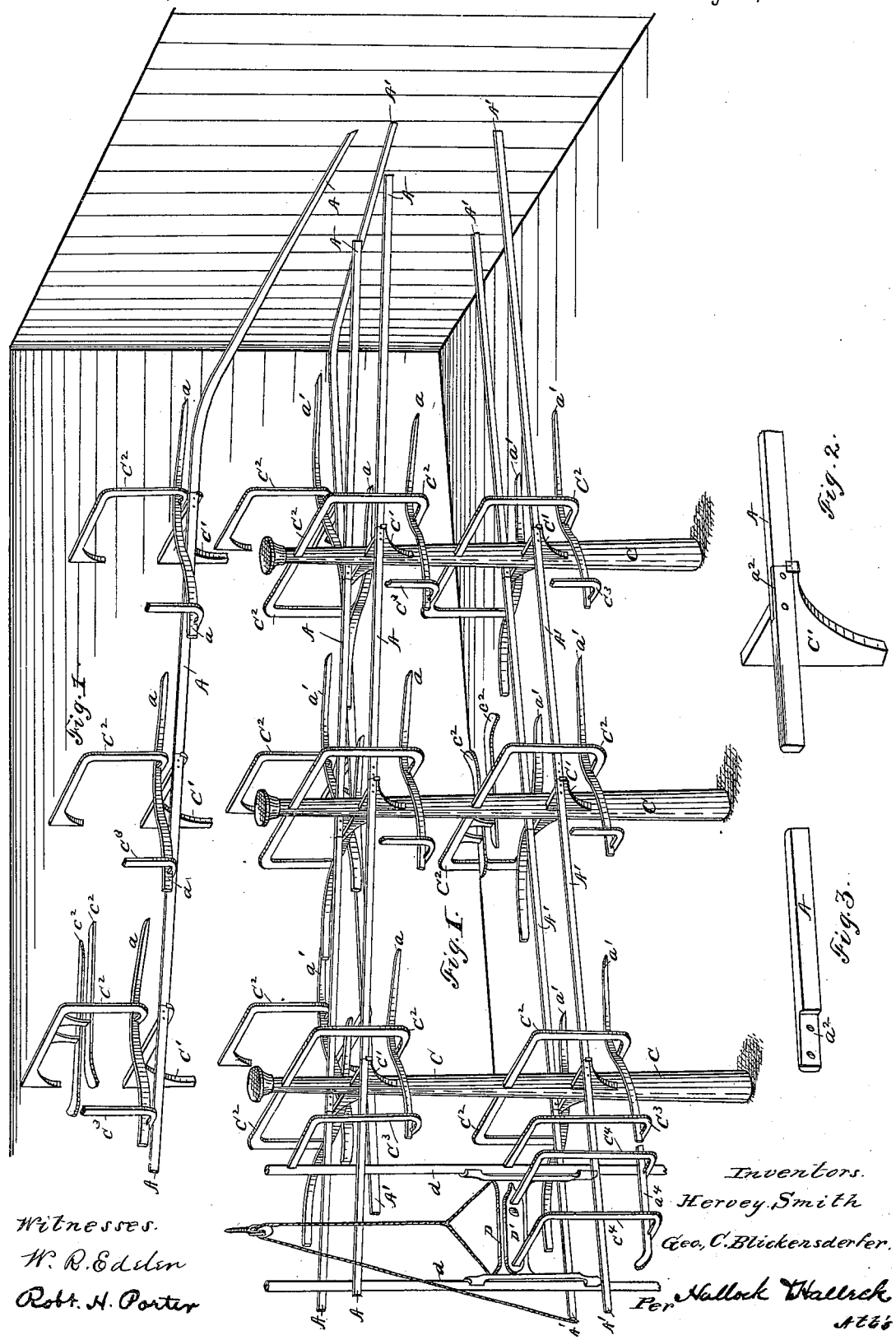
Witnesses.
W. R. Edden
Robt. H. Porter
Inventors.
Hervey Smith
Geo. C. Blickensderfer
Per Hallock & Hallock
Atty's

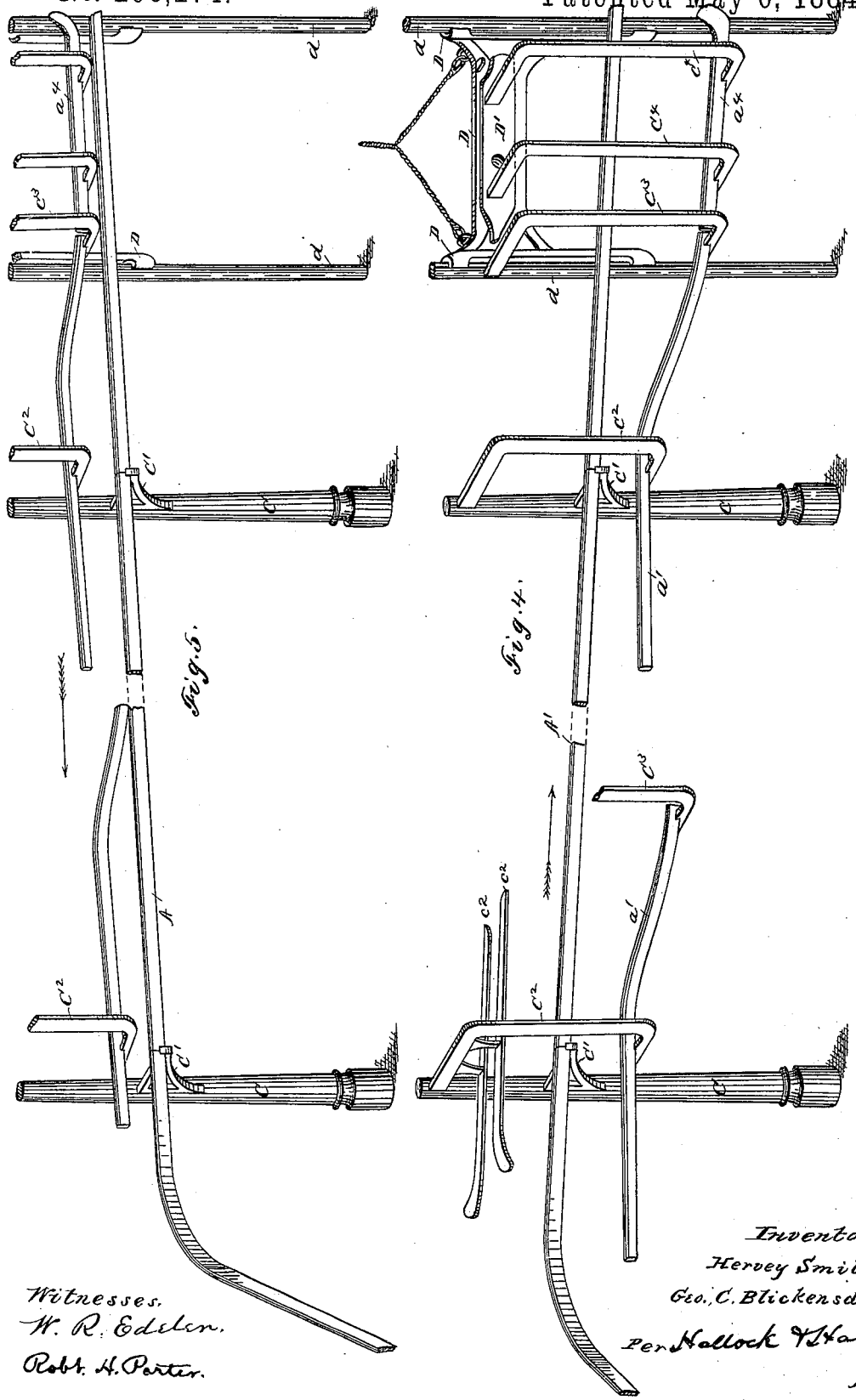

(No Model.) 5 Sheets—Sheet 3.
G. C. BLICKENSDERFER & H. SMITH.
CONVEYER APPARATUS.
No. 298,274. Patented May 6, 1884.
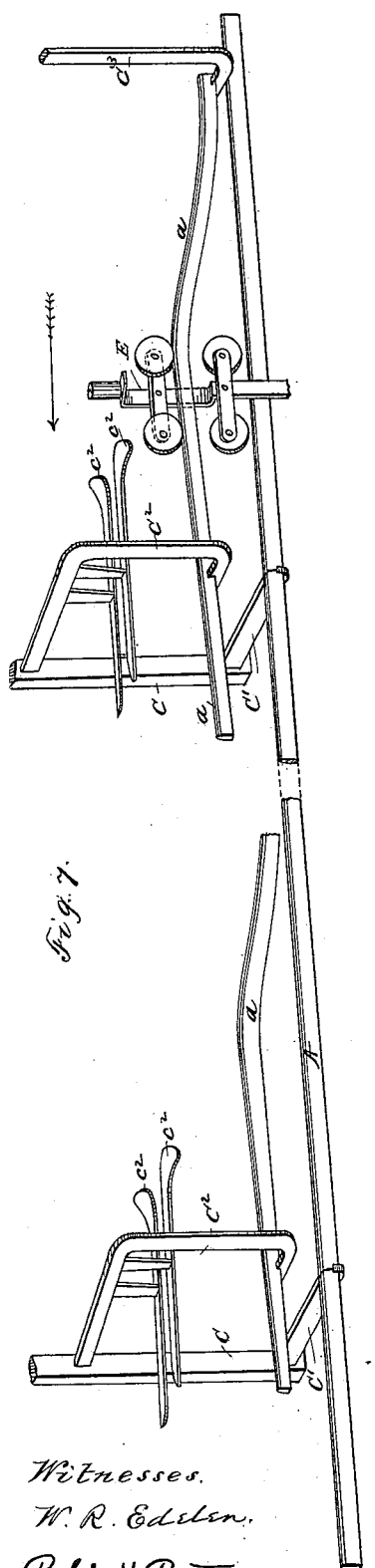
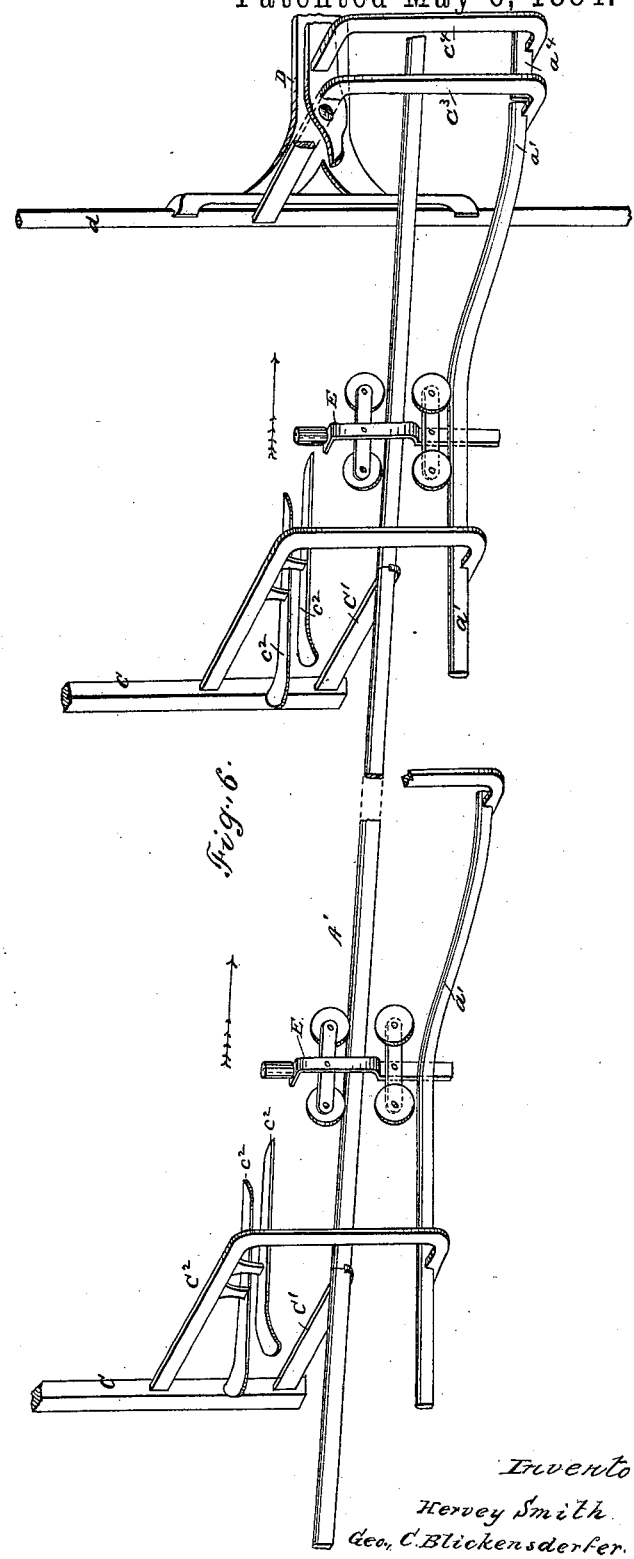
Witnesses.
W. R. Edelen.
Robt. H. Porter.
Inventors,
Hervey Smith
Geo. C. Blickensderfer.
Per. Hallock & Hallock
Att's (No Model.) 5 Sheets—Sheet 4.
G. C. BLICKENSDERFER & H. SMITH.
CONVEYER APPARATUS.
No. 298,274. Patented May 6, 1884.
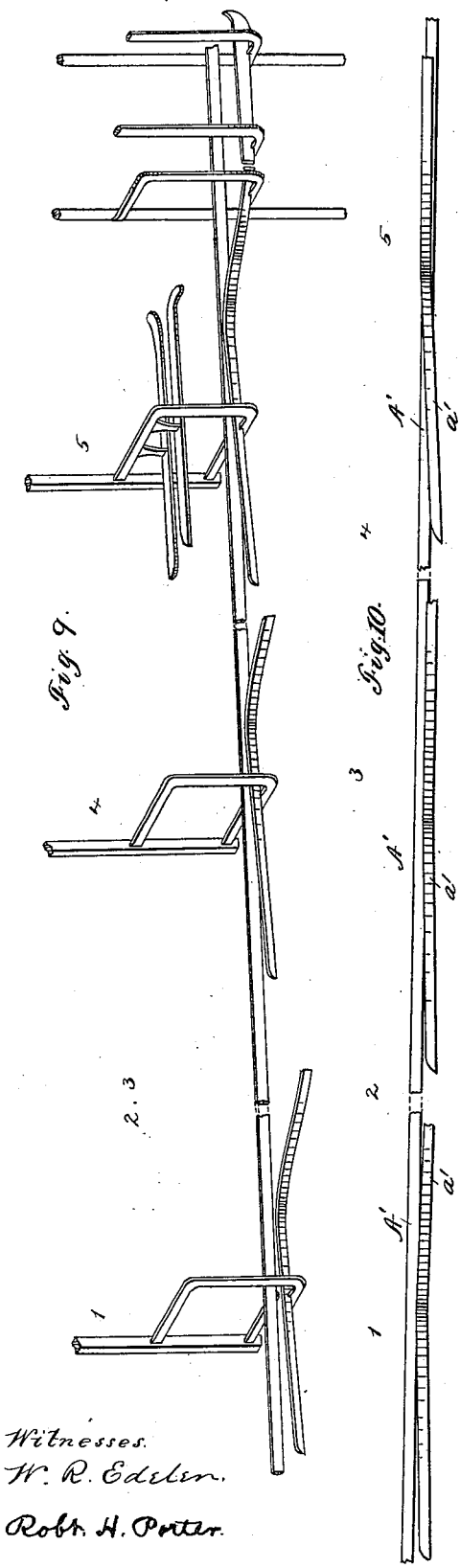
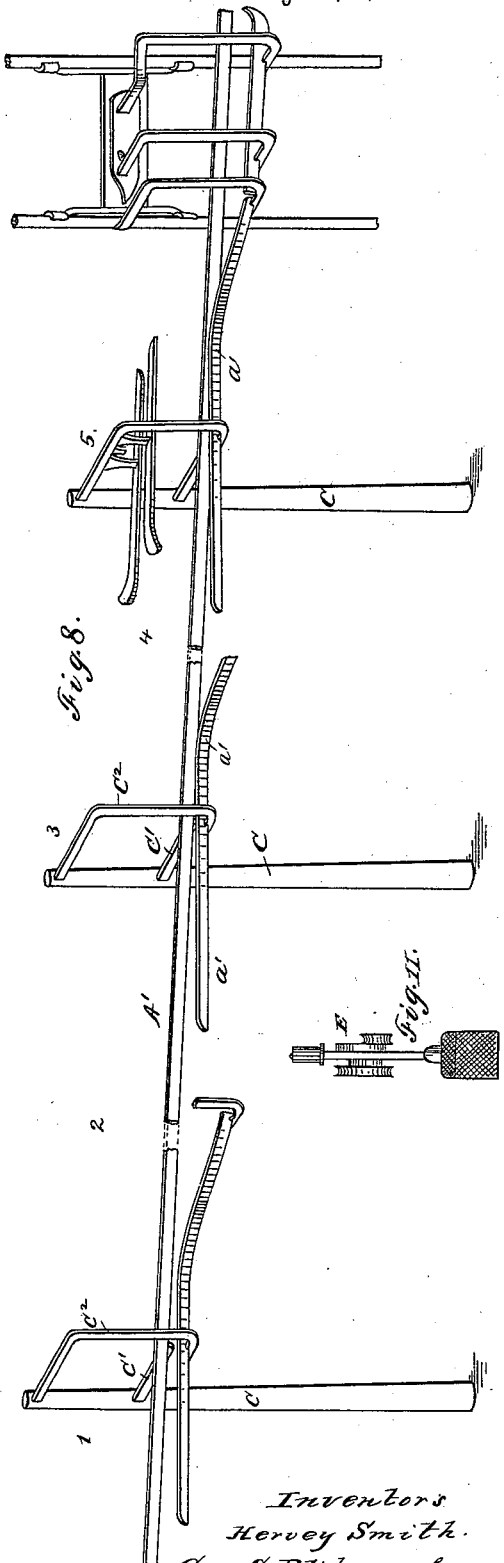
Witnesses.
W. R. Edelen.
Robt. H. Porter.
Inventors
Hervey Smith.
Geo. C. Blickensderfer.
Hallock & Hallock
Att's

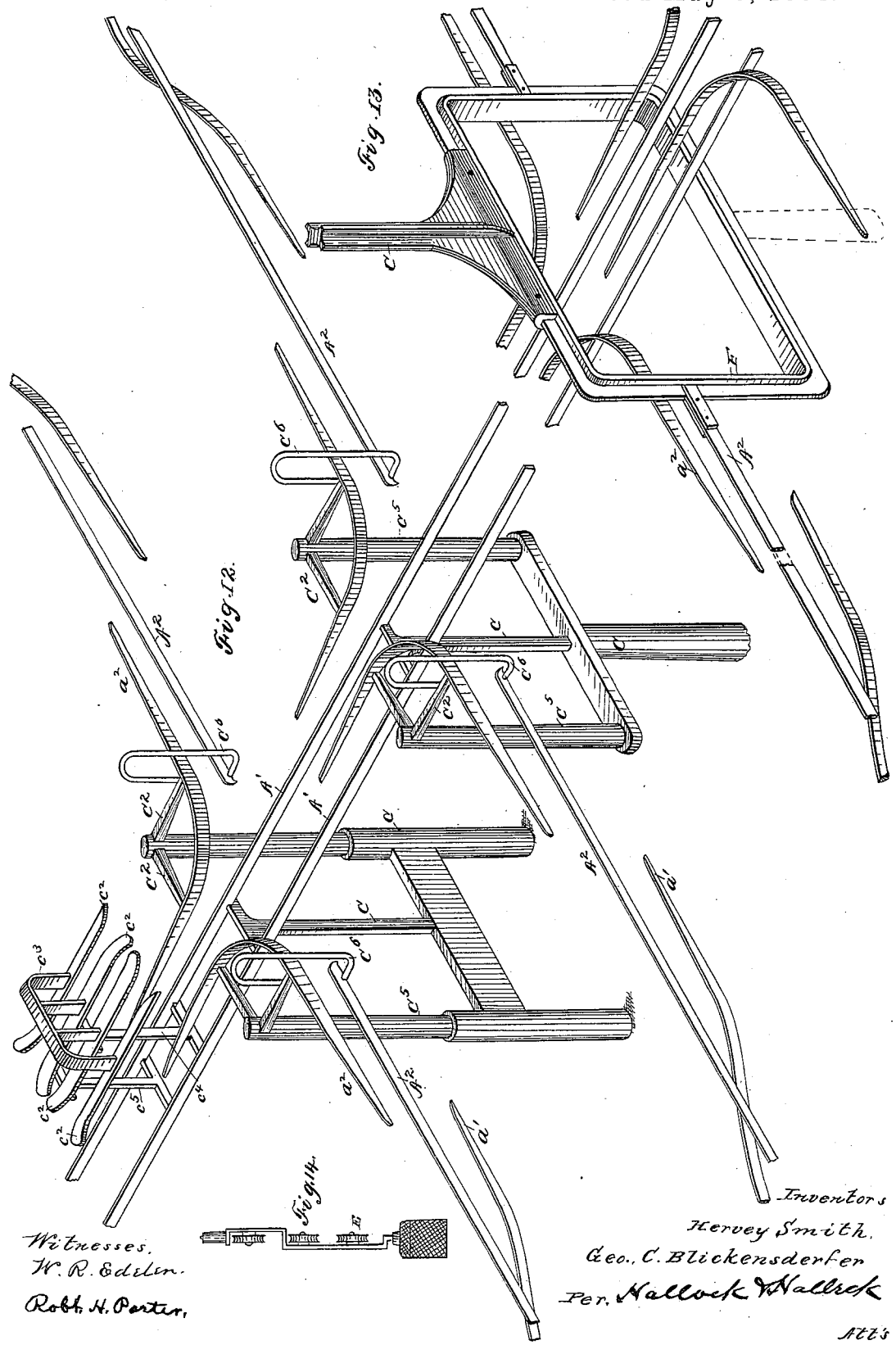

UNITED STATES PATENT OFFICE.

GEORGE C. BLICKENSDERFER AND HERVEY SMITH, OF ERIE, PA.

CONVEYER APPARATUS.

SPECIFICATION forming part of Letters Patent No. 298,274, dated May 6, 1884.

Application filed March 17, 1884. (No model.)

*To all whom it may concern:*

Be it known that we, GEORGE C. BLICKENSDERFER and HERVEY SMITH, citizens of the United States, residing at Erie, in the county of Erie and State of Pennsylvania, have invented certain new and useful Improvements in Conveyer Apparatus; and we do hereby declare the following to be a full, clear, and exact description of the invention, such as will enable others skilled in the art to which it appertains to make and use the same.

This invention relates to conveyers—such as conveyers of packages, cash, &c., in stores, or other similar conveyers; and it consists in providing certain improvements in the construction, sustentation, and adjustment of the tracks and switches, as will hereinafter fully appear.

In four preceding applications, of which this is intended as a companion, we have shown different methods of constructing and arranging the switches and cars, and we have shown different methods of sustaining the tracks and switches, and a system of main and branch tracks and switches for transferring cars from the main to the branch tracks; but in all of the said applications we have only shown tracks formed of taut-drawn wire. In this case we show our various inventions embodied in constructions wherein the tracks and switches are formed of bars of metal, (or they may be of wood,) supported at proper intervals on posts or brackets, as the case may require.

We are aware that it is common in the construction of various forms of conveyers—such as hay-conveyers, coal-conveyers, and the like—to use bars of metal or wood to form the track, and to support the same by brackets or posts, as the case may require; but in the application of such well-known forms of tracks to our systems of tracks and switches, and in the erection of the same in stores, many novel features of construction have been required, and of these our invention herein set forth consists.

In the accompanying drawings we show all the various methods of adjusting the switches, which are shown in our preceding applications—viz., adjusting the switches either above or below the direct track in a vertical plane therewith, and using a car with two sets of wheels—one above the other—or adjusting the switches at one side of the direct line and using a car with two sets of wheels lying side by side, and also the use of a transfer-switch for taking cars from one track and placing them on another, which is an intersecting or branch track, and using a car having three sets of wheels—one for the main or direct tracks, both branch or trunk line, one for use on the transfer-switches, and the third for use at receiving or way stations. We have shown all these different systems or methods for the purpose of fully instructing others in the art of erecting our said systems with tracks formed of series of bars. The condition or arrangement of store-rooms are so various that many modifications of the erecting or sustaining devices are required, and so we have shown various constructions, all of which, however, embody the essential or primary features of our present invention.

Figure 1 of the accompanying drawings is a perspective view of the store-room in which a row of pillars extend down its middle, and which would have a line of counters next each wall and on each side of the row of pillars, and we have there shown a conveyer system supported from the wall on brackets and two systems on the pillars. The central station, or cashier's desk, is supposed to be at the right of the figure, and the upper tracks, A, grade to it, and the lower, A', grade from it. Figs. 2 and 3 show details of construction. Figs. 4 and 5 show a system erected on standards or posts specially provided for that purpose, and which may stand on the counters or on the floor. Figs. 6 and 7 show a system erected on hangers which depend from the ceiling. Fig. 8 shows a system having its switches lying beside the main track, in which such a car as is seen in Fig. 11 is used, and it is shown as supported on special posts. Fig. 9 shows the same system supported by pendent hangers. Fig. 10 is side view of the track and switches of such a system when formed of bars. Fig. 12 shows a system of trunk and branch lines, with transfer-switches and receiving-switches, all supported on posts. Fig. 13 shows the same system supported by pendent hangers. Fig. 14 is an view of a car such as is used on such a system.

A indicates the main track which grades to the cashier's desk or central station; A', the main track which grades from said station to the way-stations; $A^2$, the branch tracks; *a*, the shipping-switches; $a'$, the receiving-switches; $a^2$, the transfer-switches; $a^4$, the section of switch-track on the elevator.

C in all cases represents the main support, whether it be a post, pillar, or a depending hanger.

C' is in all cases the main-track supporting-bracket, whether it extend from a post, pillar, hanger, or from the wall.

$C^2$ is in all cases the principal switch-supporting bracket.

$C^3$ is a secondary switch-supporting bracket extending from the elevator guide-posts $d$.

$C^4$ are the brackets which support the section $a^4$ of switch-track on the elevator.

$C^5$ (seen only in Fig. 12) is a part of the main support which holds the switch-brackets $C^2$.

$C^6$ (seen only in said Fig. 12) is a bracket or hanger, which supports the ends of the branch lines $A^2$.

$c^3$ are the guides over the switches, and in Fig. 12 $c^3$, $c^4$, and $c^5$ are guide-supports.

D represents the elevator-frame; $d$, the elevator posts or guides; D', the tilting bar on the elevator to which the track $a^4$ is attached.

E in all cases represents the car, no matter which form of construction is shown, and F is a frame connected with a pendent hanger supporting branch tracks and transferring-switches. The construction can be easily understood from the drawings, and hardly needs any detailed description, further than what has been given above in the description of the drawings. The tracks are formed of bars of iron or wood set edgewise and overlapping, preferably, at their joints, which occur at the brackets C'. The switches are made of bars bent into proper form, and the brackets $C^2$, which assist in their support, overreach the main track and the switch, so as to offer no incumbrance to the passage of the cars. The transfer-switches, which are seen in Fig. 12, are pointed at each end, so as to form the proper grade up and down which such switches must have.

In such a system as is shown in Fig. 12 the guides $c^2$ $c^2$, &c., are best sustained by standards $c^4$ $c^5$, and arches $c^3$, as shown, the said standards being connected with the bar-track.

What we claim as new is—

1. In a conveyer apparatus substantially as shown, the combination, with a series of main supports, C, of main tracks A A', formed of series of bars supported on brackets and graded in opposite directions, a series of shipping switch-tracks, $a$, arranged along the main track A, and a series of receiving switch-tracks, $a'$, arranged along the main track A', which switch-tracks are formed of bars and are supported on brackets independently of said main tracks, as shown.

2. In a conveyer apparatus substantially as shown, the combination of main lines formed of bars supported on brackets, and switch-tracks formed of properly-curved bars supported independently of the main tracks on brackets, substantially as shown.

3. In a conveyer apparatus substantially as shown, the combination, with a series of main supports, C, of a main track, branch tracks, and transfer switch-track, all formed of bars supported from said main supports, substantially as and for the purposes set forth.

4. In a conveyer apparatus substantially as shown, the combination, with a main and a branch or intersecting track, of a transfer switch-track formed of a curved bar pointed at each end, as shown, and for the purposes set forth.

5. In a conveyer apparatus substantially as shown, the combination, with two parallel tracks, A' A', and the guides $c^2$ $c^2$, of the guide-supports $c^3$ $c^4$ $c^5$, sustained by said tracks, as shown.

In testimony whereof we affix our signatures in presence of two witnesses.

GEO. C. BLICKENSDERFER.
HERVEY SMITH.

Witnesses:
J. K. HALLOCK,
ROBT. H. PORTER.